June 19, 1962 H. RUDOLPH 3,040,122
TELEPRINTER SIGNAL TRANSMISSION APPARATUS
Filed April 21, 1959
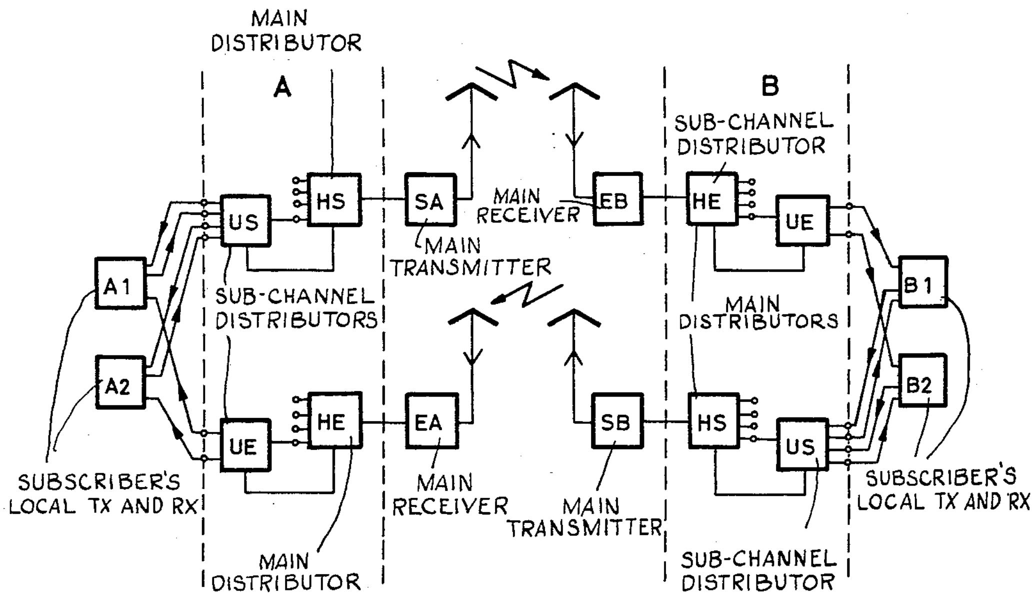
Inventor:
HANS RUDOLPH
By Toulmin & Toulmin
Attorneys United States Patent Office 3,040,122

Patented June 19, 1962

3,040,122
TELEPRINTER SIGNAL TRANSMISSION APPARATUS

Hans Rudolph, Munich-Solln, Germany, assignor to Siemens & Halske Aktiengesellschaft, Berlin, Germany, a German company Filed Apr. 21, 1959, Ser. No. 807,823
Claims priority, application Germany Apr. 23, 1958
12 Claims. (Cl. 178—2)

This invention relates to teleprinter signal transmission apparatus and is concerned with time-division multiplexing in such apparatus to provide two or four teleprinter channels.

When teleprinter signals are transmitted over transmission paths which are liable to interference, in particular over radio paths, special precautions are often taken to keep the number of transmission errors caused by interference as low as possible. For this purpose a protective or error-detecting code is used and the apparatus may be designed to provide correction of mutilated signals by means of automatic repetition.

The protective code normally used is a 7-unit code in which each character consists of three spaces and four marks and, as teleprinter apparatus normally operates with a 5-unit code (for example, the International Telegraph alphabet No. 2), a code converter must be provided to convert teleprinter signals in the 5-unit code to corresponding signals in the 7-unit code. Automatic error correction is particularly applicable to transmission systems having a large capacity and accordingly the invention will be described with reference to a multiplex system having at least two channels. In such systems a pulse distributor is provided which at the transmitter serves both to interleave the signals belonging to the different channels and also to control the conversion of the individual character combinations from the parallel to the sequential form.

Before a detailed description of apparatus according to the invention is given, the principle of operation of the whole transmission system will be explained below as far as it appears to be necessary and advisable for the understanding of the invention.

The system to be described serves for the simultaneous transmission of two or more teleprinter messages according to the time-division multiplex principle, the description being based on a two-channel system.

As it would be a disadvantage to employ special signal transmitters and receivers for teleprinter connections which require a special protection against transmission errors and which are suited directly for, for example, the 7-unit code, the transmission systems intended for this purpose are provided with code converters. In the terminal equipment and in feeder lines, if any, the normal 5-unit code is used, and each signal of the 5-unit code is translated into a corresponding signal of the 7-unit code by means of a (5/7)-code converter, before it is sent over the path that is liable to interference. At the end of this path each of the signals that is received without mutilation is re-translated into the corresponding signals of the 5-unit code by means of a (7/5)-code converter and fed into the receiver.

The receiver includes means for counting the number of space or mark elements in each received 7-unit code signal. If the space-/mark ratio is 3:4 the respective signal is accepted as being undistorted. If there is a deviation from this 3:4 ratio, mutilation of the signal must have occurred; the receiving arrangement orders the transmitter of its own station (for instance by means of a voltage pulse) to send to the distant station a request for a repetition. The repetition-request signal consists of a combination of the 7-unit code of the same type as is used for characters, i.e. it also has a space- to mark ratio of 3:4; it is called hereinafter an RQ signal.

There are altogether 32 different combinations in the 5-unit code, and a similar number of combinations must be used in the 7-unit code. During a pause in a message a circuit being operated with a 5-unit code is kept in the condition of continuous space current; when a clearing signal is required the condition is changed to continuous mark current. These two continuous states must also be translated in a time-multiplex transmission system into the form of 7-unit code signals with a space-/mark ratio of 3:4, because any other form of signal would be regarded by the receiver as a mutilated signal, and would give rise to continuous repetition. The 7-unit code combination provided for the transmission of the continuous mark state is usually denoted by $\alpha$, and that for the continuous space state by $\beta$. As a total of 35 7-unit combinations with a space-/mark-unit ratio of 3:4 are available, one combination is left for the RQ signal. In a two-channel time-division multiplex system of the type forming the basis of the present invention, single characters from the two channels are transmitted alternately. If the two channels are called channel A and channel B, the seven units of a character belonging to channel A are immediately followed by the seven units of a character belonging to channel B, followed directly again by the seven units of the next-following character of channel A, and so on. The sequence in time of the combinations and of the elements constituting the combinations is controlled by a distributor. In the course of one revolution of the distributor, a signal of channel A is transmitted in the first half of the period, and a signal of channel B is in the second half. The transmitter and the receiver at each station both contain distributors. All the distributors must run synchronously and in the correct phase. The necessary synchronising systems are well known and are, therefore, not described in detail herein.

If a mutilated signal is received, for example, in channel A, a repetition process is triggered off in this channel which operates in the following way (the transmission of information in channel B remaining completely unaffected):

The transfer transmitter which normally passes the characters that are correctly received to the teleprinter receiver in the 5-unit code, is blocked for the duration of four revolutions of the receiver distributor, even though in the meantime unmutilated signals may be received. The transmitter at the receiving station receives the order to request a repetition (for example, in the form of a voltage pulse).

The transmitter interrupts the transmission of the message at the beginning of the next following revolution of the transmitter distributor, and transmits back the RQ signal to the distant station; then the transmitter repeats the last three signal combinations i.e., the three characters which directly preceded the RQ signal. The repetition process extends, therefore, over four distributor revolutions.

The RQ signal is received in the distant station with a time delay corresponding to the path transmission time and initiates a repetition process identical with the one described above. Since the transfer transmitter is blocked for four revolutions of the distributor neither the RQ signal, nor the three following (repeated) signals are passed on to the teleprinter receiver. The RQ signal, which is sent out before the characters are repeated, arrives at the first station while the transfer transmitter is still blocked; it has, therefore, no effect. Subsequently, however, the blocking period is finished and the three following (repeated) characters are passed on to the receiver, if they are received correctly this time. The first of these repeated characters is the one that was mutilated and the next two characters are the ones which were suppressed, together with the mutilated signal, when they were received for the first time. This completes the repetition process and normal transmission can be continued. If an RQ signal is itself mutilated, the process of repetition still proceeds as above, because there is no difference between the effect of a mutilated signal and that of a correctly received RQ signal.

A principal object of the present invention is the provision of a two-channel system for the multiplex transmission of teleprinter signals with automatic error correction, as hereinbefore described, in which each channel is so subdivided that the transmission capacity of a sub-channel which is not being utilised is available to a subscriber in addition to the transmission capacity of the sub-channel allotted to that subscriber.

A further object of the present invention is the provision of a multi-channel (including two) system for the multiplex transmission of teleprinter signals with automatic error correction, as hereinbefore described, wherein continuous space current in the line from a first subscriber makes available to a second subscriber the transmission capacity of the first subscriber's sub-channel and continuous mark current in the line from the second subscriber makes available to the first subscriber the transmission capacity of the second subscriber's sub-channel.

The present invention will be of particular benefit to companies with widely distributed organisations (for example, airline companies) which demand separate teleprinter channels for their private information services because of the unavoidable but intolerable delays which build up in the peak transmission hours of the general telex service for obvious reasons. At the present time, when a channel is divided into, say, four sub-channels, each subscriber is allotted one quarter of the transmission capacity of the main channel. However, whilst this manner of operation proves less expensive from the line-charge point of view, the speed of transmission is relatively slow.

The present invention will now be more particularly described with reference to the accompanying drawing which is a block diagram of two teleprinter stations A and B, each of which is provided with multiplex arrangements. Station A comprises at least a locally fixed radio transmitter SA; a main transmission distributor HS, for example a rotating commutator provided with all the usual equipment; a sub-channel distributor US the output of which is connected to one of the four channel input terminals of the main distributor HS and which has two inputs, namely two sub-channels U1 and U2 which are connected to subscribers A1 and A2, respectively. The distributor US is similar to the aforementioned distributor HS and, for example, may be similar in operation and construction to the multiplex distributor disclosed in the United States Patent No. 2,205,406. Station A also includes a radio receiver EA, a main reception distributor HE, a sub-channel distributor UE which is connected to one of the four channel output terminals of the main distributor HE and which divides the reception channel into two sub-channels U1 and U2 which are connected to subscribers A1 and A2, respectively. Similarly, station B comprises at least a locally fixed radio transmitter SB, a main transmission distributor HS, and a sub-channel distributor US the output of which is connected to one of the four channel input terminals of the main distributor HS and which has two inputs, namely two sub-channels U1 and U2, which are connected to subscribers B1 and B2, respectively. Station B also includes a radio receiver EB, a main reception distributor HE, and a sub-channel distributor UE which is connected to one of the four output terminals of the main distributor HE and which divides the reception channel into two sub-channels U1 and U2.

The sub-channel U1 connects subscriber A1 to subscriber B1, and the sub-channel U2 connects subscriber A2 to subscriber B2.

Information signals from each subscriber are punched into tape (intermediate storage means) which is fed at a rate determined by the number of subscribers requiring the use of the channel allocated thereto. This "calling" of the tape is represented in the drawing by the leads from US containing arrows pointing towards A1, A2 and B1, B2.

The associated main and sub-channel distributors are so coupled together that the necessary synchronism is ensured.

It is considered to be sufficient, for the present invention to be understood, to describe only one direction of transmission, for example, that from A to B, and it will be assumed initially that one half of the transmission capacity of the main channel is allocated to each of the two sub-channels. During operation each one of the two subscribers A1 and A2 successively sends the signals of his message and, during message pauses, continuous space current. In the set of the subscriber A1, for example, the continuous mark current therefrom is translated into idle signal $\beta$ combinations, whereas in the set of the subscriber A2, the continuous mark current is translated into idle signal $\alpha$ combinations. If there is continuous space current transmitted from the subscribers A1 and A2, then the signals $\alpha$ and $\beta$ are translated in the reversed allocation ($\alpha$ combinations from A1, $\beta$ combinations from A2).

When, for instance, subscriber A2 comes to the end of his transmission and creates the condition of continuous space current, indicating that his sub-channel is now free, by pushing a "stop" or "end of message" key in his teleprinter set, idle signal $\beta$ is transmitted continuously through the sub-channel U2, and a switching arrangement associated with the sub-channel U2 in the distributor UE is operated to allocate this sub-channel to the subscriber A1 after the receipt of at least two of the idle signals $\beta$.

The switching arrangement will be more particularly described hereinafter. In addition, a register in the sub-channel U2 in the distributor US starts which, after receiving at least three consecutive $\beta$ combinations, permits the operation of a switch and thereby allocates to subscriber A1 the sub-channel U2 which is now available. Thus, subscriber A1 is enabled to complete his transmission with the increased speed afforded by the increased capacity. Similar conditions apply when subscriber A1 finishes his transmission before subscriber A2 does so. In this case, the transmission capacity of the sub-channel U1 is allocated to subscriber A2 after the idle signal $\alpha$ has been transmitted three times by subscriber A1 to a register allocated to sub-channel U1 in the distributor US.

The register in the distributor US may, for example, consist of a plurality of serially connected valves which are arranged to be conditioned by the transmitted signal in such a manner that the states of the valves "register" the latter mentioned signal. On the receipt of each $\alpha$ or $\beta$ signal one input circuit of an AND gate operative in response to three inputs is conditioned. Thus, when three successive $\beta$ combinations are received by the register the AND gate operates and actuates the said switching arrangement.

If the condition of both subscribers A1 and A2 is such that they are both transmitting space current and subscriber A1 wants to transmit a message, he will transmit the continuous mark current condition (idle signals $\beta$), and upon the register allocated to the sub-channel U1 receiving at least three consecutive ones of the idle signals $\beta$, both the sub-channels U1 and U2 will be available for messages transmitted from A1. Both of the sub-channels are available since idle signals $\beta$ (corresponding to continuous space current) are being sent in subchannel U2 from the subscriber A2.

If, during transmission by subscriber A1 of either message signals or idle signals $\beta$, subscriber A2 wants to transmit a message, he will switch over from continuous space (idle signals $\beta$) to continuous mark (idle signals $\alpha$) by pushing a "call" key on his teleprinter set. The sub-channel U2 allocated to subscriber A2 will be blocked for subscriber A1 after the transmission of the first one of the said mark signals which operates the switching arrangement associated with this sub-channel in the distributor UE. The subscriber A1 can then continue his message transmission only with the reduced speed of the transmission capacity of the sub-channel U1 allocated to him. In addition to the above operation the register allocated to the sub-channel U2 in the distributor will start and effect, by switching means similar to that aforesaid, the release of the sub-channel U2 for message transmission from subscriber A2 after at least three consecutive idle signals $\alpha$ have been sent therefrom.

The receiving partner for the transmitting subscriber A1 is the subscriber B1, that is, messages sent by subscriber A1 must be routed only to subscriber B1. Similarly, messages from subscriber A2 must be routed only to subscriber B2. Conversely, messages sent by subscriber B1 (or B2) must be routed only to subscriber A1 (or A2) and since these processes are effected in the same way as has been explained above they need not be considered separately.

In order to ensure correct routing of messages, arrangements are provided in the receiving sections of the stations A and B to determine, separately for each of the sub-channels U1 and U2, whether an idle signal $\alpha$ or $\beta$ has been received. Every time an idle signal $\beta$ is received via sub-channel U1, the character combination is delivered to a switching arrangement which ensures that continuous mark signals are transmitted on the transmission line to subscriber B1. If, previously, several idle signals $\beta$ have been received via this sub-channel the position of the switching arrangement will remain unaltered, even if in the meantime message signals are received by subscriber B1. A second switching arrangement operates similarly when $\alpha$ or message signals (for subscriber B2) are received via sub-channel U2. If a single idle signal $\beta$ (continuous space current) is sent via sub-channel U2 to subscriber B2, the last-mentioned switching arrangement is conditioned to stand-by and the said switching arrangement is reconditioned to effect its normal function if subsequently an idle signal $\alpha$ or a proper message signal is received. If, however, at least one further idle signal $\beta$ is sent via the sub-channel U2, the line to subscriber B2 is switched (by the switching arrangement which is standing-by) to the condition of continuous space current and all message signals sent via the sub-channel U2, as well as the message signals sent via the sub-channel U1, are now routed to subscriber B1.

In general, and considering transmission from A1, A2 to B1, B2, the additional arrangements at the receiving end for the operation whereby the sub-channels U1 and U2 are combined, have the effect that all messages which are received after at least two successive idle signals $\beta$ in sub-channel U1 alone, or in each of the sub-channels U1 and U2, are routed to subscriber B1, and that all messages which are received after two successive idle signals $\alpha$ in sub-channel U2 or in each of sub-channels U1 and U2, are routed to subscriber B2. Care is always taken at the same time to ensure that the unaffected receiving subscriber (B1 or B2) receives continuous space signals for as long as the other subscriber is receiving a message over both sub-channels. The sequence of events is unaffected by repetitions which occur when a mutilated signal (falsified 3:4 ratio) has been received, even if the distorted signal which is corrected by repetition is an $\alpha$ or $\beta$ signal. The method is very proof against double-line faults which incorrectly change a signal other than an idle signal into an apparently correct idle signal $\alpha$ or $\beta$. This is because such signals received singly do no more than cause the switching arrangement to stand-by, as hereinbefore described. Similarly, a lost idle signal can do no harm because at least three $\alpha$ or $\beta$ signals must be transmitted before any operational change is effected at the transmitting end, whereas for any change of operational state to be effected at the receiving end at least two $\alpha$ or $\beta$ signals must be received.

The method according to the invention was explained by means of a simple example, according to which one main channel was divided into two sub-channels. If, for instance, a main channel is to be divided into four sub-channels, then it is possible according to the method of the invention to arrange the four sub-channels in pairs in accordance with the example so that, when one of the sub-channels of any pair is not being used, the transmission capacity thereof is added to that of the other sub-channel of the same pair.

The arrangements for carrying out the described method thus comprise, in both the transmitter and the receiver sections, a register for each pair of sub-channels which registers the reception of $\alpha$ and $\beta$ signals and which, after it has received a corresponding number of signals successively, switches one sub-channel so as either, in effect, to join it to or to separate it from the other sub-channel. Also each teleprinter station needs a simple known evaluating device which delivers a character to the said register when it receives an $\alpha$ or $\beta$ combination. The other arrangements of the multiplex system can then be kept unchanged.

What I claim as my invention and desire to secure by Letters Patent of the United States is:

1. Teleprinter signal transmission apparatus comprising a first and a second transmitter located at a first station, and a first and a second receiver located at a second station, a first and a second sub-channel connected between the first and second stations, switching means operative in response to first idle signals from the first transmitter to enable communication to be established over the first sub-channel between the first transmitter and the first receiver only, and operative in response to second idle signals from the first transmitter to enable communication to be established over the first sub-channel between the second transmitter and the second receiver only, and further switching means operative in response to the said first idle signals from the second transmitter to enable communication to be established over the second sub-channel between the first transmitter and the first receiver only, and operative in response to the said second idle signals from the second transmitter to enable communication to be established over the second sub-channel between the second transmitter and the second receiver only.

2. Teleprinter signal transmission apparatus comprising a first and a second transmitter located at a first station, and a first and a second receiver located at a second station, a first and a second sub-channel connected between the first and second stations, first change-over switching means at the first station capable of making the first sub-channel available for message transmission alternatively by the first and second transmitters, second change-over switching means at the first station capable of making the second sub-channel available for message transmission alternatively by the first and second transmitters, a first register associated with the first transmitter and responsive to first idle signals transmitted by the first transmitter to condition the first change-over switching means for message transmission over the first sub-channel between the first transmitter and the first receiver, and responsive to second idle signals transmitted by the first transmitter to condition the first change-over switching means for message transmission over the first sub-channel between the second transmitter and the second receiver, and a second register associated with the second transmitter and responsive to first idle signals transmitted by the second transmitter to condition the second change-over switching means for message transmission over the second sub-channel between the first transmitter and the first receiver, and responsive to second idle signals transmitted by the second transmitter to condition the second change-over switching means for message transmission over the second sub-channel between the second transmitter and the second receiver.

3. A multi-channel teleprinter signal transmission system comprising a first and a second teleprinter transmitter at a first station and a first and a second teleprinter receiver at a second station, radio transmitter means common to the first and second teleprinter transmitters for transmitting therefrom both message signals and idle signals through first and second sub-channels, a sub-channel distributor having first and second input circuits coupled to the first and second teleprinter transmitters, respectively, and having an output terminal connected to the radio transmitter means, a code converter connected in each of the first and second input circuits, means at said second station for detecting mutilated signals and for automatically causing re-transmission of the signals which had been mutilated, radio receiver means common to the first and second teleprinter receivers, a further sub-channel distributor having first and second output circuits coupled to the first and second teleprinter receivers, respectively, and having an input terminal connected to the radio receiver means, a code converter connected in each of the first and second output circuits, switching means in the first input circuit operative in response to first idle signals from the first transmitter through its associated code converter to make the first sub-channel available for message transmission between the first teleprinter transmitter and the first teleprinter receiver only, and operative in response to second idle signals from the first transmitter through its associated code converter to make the first sub-channel available for message transmission between the second teleprinter transmitter and the second teleprinter receiver, and further switching means in the second input circuit operative in response to the first idle signals from the second transmitter through its associated code converter to make the second sub-channel available for message transmission between the first teleprinter transmitter and the first teleprinter receiver, and operative in response to the second idle signals from the second transmitter through its associated code converter to make the second sub-channel available for message transmission between the second teleprinter transmitter and the second teleprinter receiver.

4. Apparatus as claimed in claim 1, wherein the first idle signals have the composition alloted to the character $\alpha$ in the International Telegraph 7-unit code, and wherein the second idle signals have the composition allotted to the character $\beta$ in the International Telegraph 7-unit code.

5. Apparatus as claimed in claim 4, wherein a group of idle signals $\alpha$ is sent by the first transmitter through the first sub-channel when use thereof is required for message transmission by the first transmitter, and wherein a group of idle signals $\beta$ is sent by the second transmitter through the second sub-channel when use thereof is required for message transmission by the second transmitter.

6. Apparatus as claimed in claim 5, wherein at least two successive idle signals $\alpha$ are sent through the first sub-channel, and at least two successive idle signals $\beta$ are sent through the second sub-channel.

7. Apparatus as claimed in claim 2, wherein two successive first idle signals are transmitted through at least the first sub-channel by the first transmitter immediately prior to message transmission therefrom, and wherein two successive second idle signals are transmitted through at least the first sub-channel by the first transmitter immediately after the cessation of message transmission therefrom.

8. Apparatus as claimed in claim 7, wherein two successive second idle signals are transmitted through at least the second sub-channel by the second transmitter immediately prior to message transmission therefrom, and wherein two successive first idle signals are transmitted through at least the second sub-channel by the second transmitter immediately after the cessation of message transmission therefrom.

9. Apparatus as claimed in claim 8, wherein the second station comprises a first switching arrangement operative in response to the said two successive first idle signals in the first sub-channel to direct any message signals therein to the first receiver, and operative in response to the said two successive second idle signals in the first sub-channel to direct any message signals therein to the second receiver, and a second switching arrangement operative in response to the said two successive second idle signals in the second sub-channel to direct any message signals therein to the second receiver, and operative in response to the said two successive first idle signals in the second sub-channel to direct any message signals therein to the first receiver.

10. A system as claimed in claim 3, wherein the second station comprises a switching arrangement connected in the first output circuit and operative in response to the first idle signals in the first sub-channel to direct any subsequent message signals therein to the first teleprinter receiver, and operative in response to the second idle signals in the first sub-channel to direct any subsequent message signals therein to the second teleprinter receiver, and a further switching arrangement connected in the second output circuit and operative in response to the second idle signals in the second sub-channel to direct any subsequent message signals therein to the second teleprinter receiver, and operative in response to the first idle signals in the second sub-channel to direct any subsequent message signals therein to the first teleprinter receiver.

11. A system as claimed in claim 10, wherein the first idle signals have the composition allotted to the character $\alpha$ in the International Telegraph 7-unit code, and wherein the second idle signals have the composition allotted to the character $\beta$ in the International Telegraph 7-unit code.

12. A system as claimed in claim 11, wherein the code converter in each of the said first and second input circuits receives signals from its associated teleprinter transmitter in the 5-unit C.C.I.T. code and converts the signals into the said 7-unit code, and wherein the code converter in each of the said first and second output circuits receives signals from its associated switching arrangement in the said 7-unit code and converts the signals into the 5-unit C.C.I.T. code.

References Cited in the file of this patent

UNITED STATES PATENTS

| | | |
|---|---|---|
| 2,171,542 | Cunningham et al. | Sept. 5, 1939 |
| 2,205,406 | Holcomb | June 25, 1940 |
| 2,416,723 | Waston | Mar. 4, 1947 |
| 2,487,178 | Potts | Nov. 8, 1949 |
| 2,706,215 | Van Duuren | Apr. 12, 1955 |